July 11, 1933.  E. E. GREVE  1,918,097

DRAWWORKS

Filed April 21, 1931  2 Sheets-Sheet 1

INVENTOR
Edgar E. Greve
by Byrnes, Stebbins, Parmelee & Blenko
his attorneys

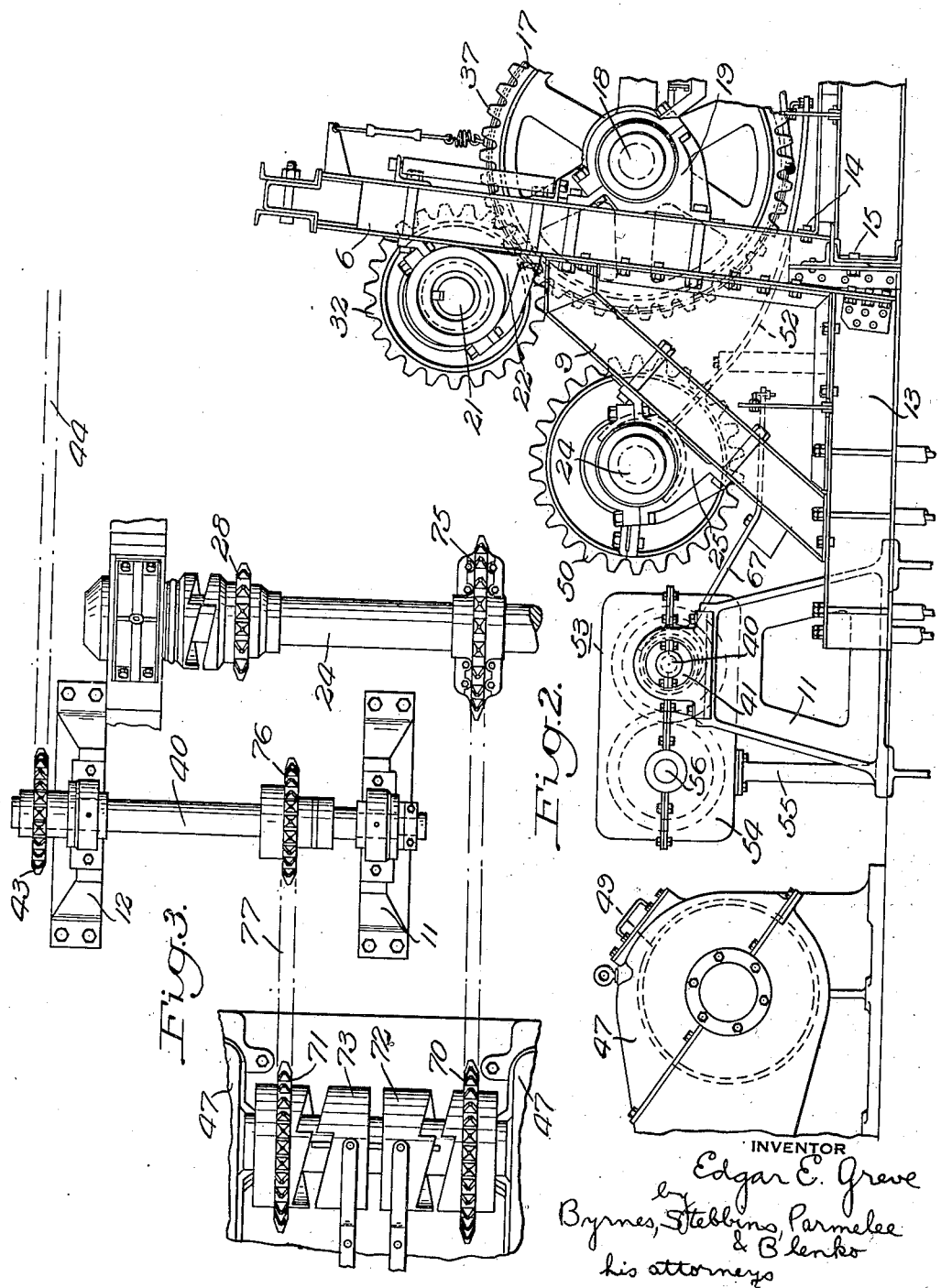

Patented July 11, 1933

1,918,097

UNITED STATES PATENT OFFICE

EDGAR E. GREVE, OF BELLEVUE, PENNSYLVANIA, ASSIGNOR TO OIL WELL SUPPLY COMPANY, OF OIL CITY, PENNSYLVANIA, A CORPORATION OF NEW JERSEY

DRAWWORKS

Application filed April 21, 1931. Serial No. 531,721.

This invention relates to a drawworks, to be used in oil well drilling, which is provided with a power take-off for the actuation of the rotary.

The customary practice in rotary drilling operations is to use the same prime mover which drives the drawworks for driving the rotary table. Generally, a rotary drive sprocket is carried by one of the shafts of the drawworks, this sprocket functioning as a power take-off for the rotary. Various ways of arranging the power take-off have been devised; and considerable dissatisfaction has been found with the usual arrangement due to the fact that the rotary drive sprocket is mounted at a higher elevation than the rotary, so that the sprocket chain running to the rotary must necessarily slant downwardly.

In my improved drawworks, I have provided a rotary drive sprocket which is driven through one of the shafts of the drawworks from the same prime mover which drives the drawworks. My improved construction is such that the sprocket chain passed about this drive sprocket and the sprocket on the drive shaft of the rotary may be approximately horizontal; while, at the same time, the rotary may be driven independently of the counter-shaft of the drawworks, and at a plurality of different speeds.

In the drawings, in which for purposes of illustrating my invention and not as limiting the same, I have shown two embodiments which the same may assume.

Fig. 2 is a view in side elevation of the drawworks shown in Fig. 1;

Fig. 3 is a plan view of a portion of a modified construction of my improved drawworks, the remainder of this construction being similar to that shown in Fig. 1.

Figure 1:
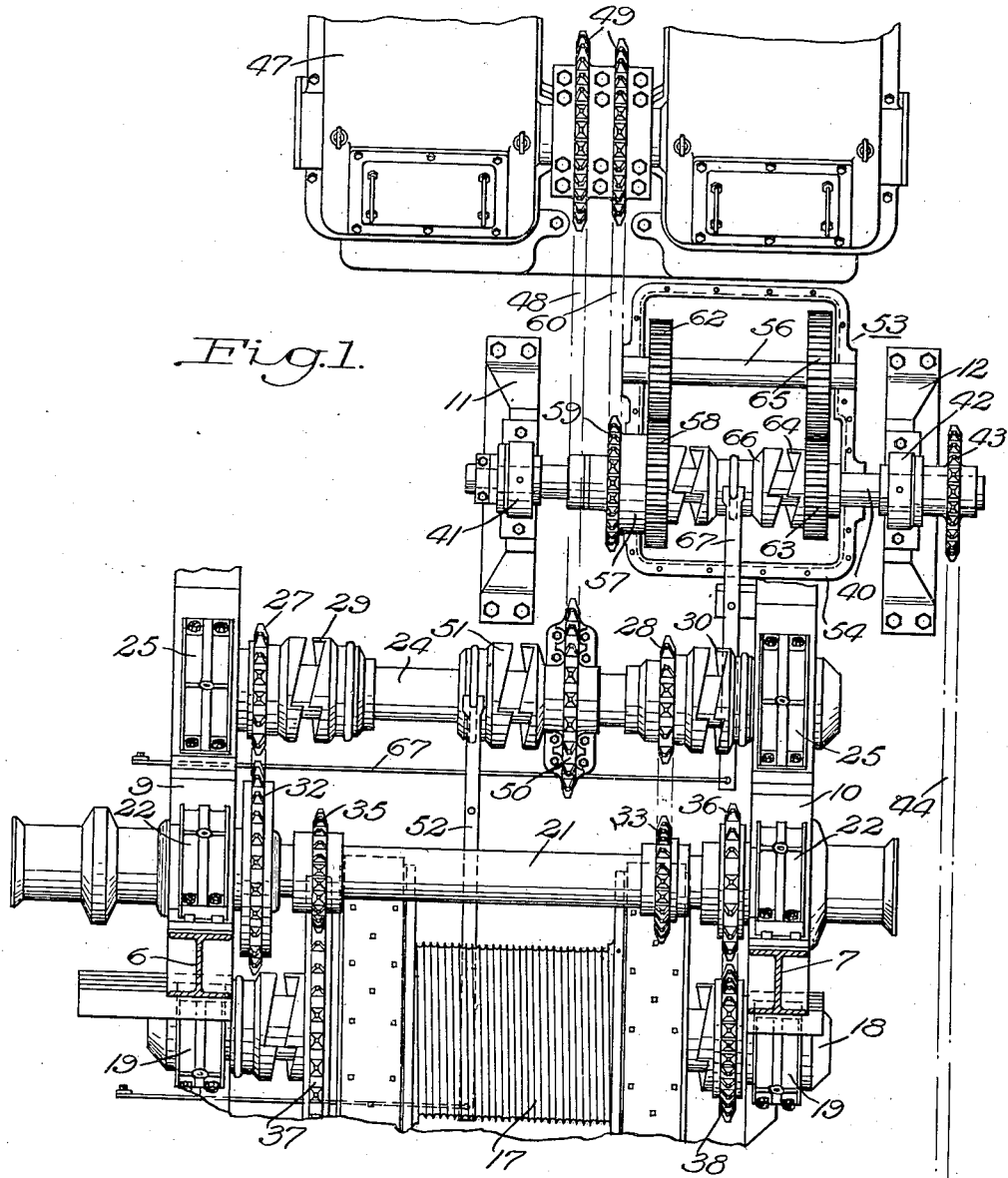
Fig. 1 is a plan view of a two-post, four-shaft drawworks embodying my invention, a portion of the drum being broken away.

It is customary to build drawworks for use in oil well drilling with a frame structure which may be secured to the floor of the derrick at one side of the same. In my improved construction, I provide a frame structure similar to that shown in my co-pending application, Ser. No. 523,235, filed March 17, 1931. The frame structure comprises two vertical posts 6 and 7, a pair of braces 9 and 10, and pedestals 11 and 12, on which are rotatably mounted four parallel shafts, later to be referred to. The frame structure also includes a substantial base including I-beams 13, the whole being riveted or in other suitable manner fastened together, and secured to the side of the drawworks floor by means of bolts 14 and 15.

A drum 17 is secured to a drum shaft 18 mounted in bearings 19 on the vertical posts 6 and 7. A line shatf 21 is mounted in bearings 22 likewise carried by the vertical posts 6 and 7. A counter-shaft 24 is mounted in bearings 25 carried by the braces 9 and 10. A pair of drive sprockets 27 and 28 are rotatably mounted on the counter-shaft 24. A clutch 29 cooperates with the sprocket 27, and a clutch 30 cooperates with the sprocket 28. Through sprocket chains (not shown in Fig. 2, but indicated in chain lines in Fig. 1) the sprocket 27 is adapted to drive a sprocket 32 secured to the line shaft 21; and the sprocket 28 is adapted to drive a sprocket 33 likewise secured to the line shaft 21. It is accordingly apparent that when the counter-shaft 24 is driven, either the clutch 29 or the clutch 30 may be engaged to drive the line shaft 21 at a lower or higher rate of speed. In a similar manner, sprockets 35 and 36 are secured to the line shaft 21, and sprockets 37 and 38 are rotatably mounted on the drum shaft 18. Clutches are provided on the drum shaft 18 so that either sprocket 37 or sprocket 38 may be clutched to the shaft 18 selectively. In this manner, provision is made for driving the line shaft from the counter-shaft at either of two speeds selectively; and the drum may be driven from the counter-shaft 24 through the line shaft 21 at any one of four speeds selectively.

A jack shaft 40 is mounted in bearings 41 and 42 provided in the pedestals 11 and 12. This jack shaft 40 extends laterally beyond the drawworks; an a rotary drive sprocket 43 is secured to the extending portion of the jack shaft. From the sprocket 43, driving connections, such as a sprocket chain (indicated by the chain lines 44), extend to a sprocket on the drive shaft of the rotary.

Driving means are provided for actuating the drawworks; and in the two embodiments shown, a prime mover 47, such as a steam engine, is disposed adjacent the drawworks. In the embodiment shown in Fig. 1, the steam engine is operatively connected with the counter-shaft 24 through sprocket and chain driving connections 48. As shown in the drawings, a double sprocket 49 is secured to the crank shaft of the steam engine, and a sprocket 50 is rotatably mounted on the counter-shaft 24. A clutch 51 actuated by suitable mechanism 52 is provided for connecting and disconnecting the sprocket 50. In this embodiment the sprocket and chain connections 48 are driven when the prime mover 47 is operated; and the counter-shaft 24 may be disconnected by disengaging the clutch 51.

In the embodiment shown in Fig. 1, the jack shaft 40 is driven from the prime mover 47 through variable speed driving mechanism 53. The variable speed driving mechanism may be between the sprocket 49 and the jack shaft 40 so that the latter is driven at a plurality of different speeds; or the variable speed driving mechanism may be between the jack shaft 40 and the sprocket 43 so that the jack shaft 40 is driven at but one speed while the sprocket 43 is driven at a plurality of different speeds. I have selected for illustration in Fig. 1 the arrangement in which the variable speed driving mechanism is between the sprocket 49 and the jack shaft 40. This mechanism comprises a casing 54 braced by a support 55. A shaft 56 is rotatably mounted parallel to the shaft 40 in bearings in the casing 54. A sleeve member 57, rotatable relative to the shaft 40, is journalled in the casing 54 and carries within the casing a gear 58 and without the casing a sprocket 59. The sprocket 59 is connected by a sprocket chain 60 to the other sprocket of the double sprocket 49. Within the casing 54 a gear 62 secured to the shaft 56 meshes with the gear 58. A gear 63 provided with clutch elements 64 is rotatably mounted on the shaft 40, this gear meshing with a gear 65 secured to the shaft 56. It is accordingly apparent that whenever the prime mover is operated, the sleeve member 59 is driven and both gears 58 and 63 are rotated. A clutch member 66 is disposed between the gears 58 and 63, and may be shifted in either direction to clutch either gear to the shaft 40. Mechanism 67 is provided for shifting the clutch 66.

If the clutch member 66 be shifted so as to engage the clutch elements on the gear 58, the shaft 40 is directly driven from the double sprocket on the crank shaft of the prime mover 47. If the clutch member 66 be shifted in the other direction so as to engage the clutch elements 64, the jack shaft 40 is driven from the prime mover through reduction gearing. It is accordingly apparent that the shaft 40 and the sprocket 43 carried thereby may be driven at either of two speeds selectively by shifting the clutch member 66 of the variable speed driving mechanism 53.

In the embodiment shown in Fig. 3, a pair of sprockets 70 and 71 are rotatably mounted on the crank shaft of the prime mover 47. Clutches 72 and 73 are provided for clutching either or both of the sprockets 70 and 71 to the crank shaft. A sprocket 75 is mounted on the counter-shaft 24. This sprocket corresponds to the sprocket 50, but is secured to the counter-shaft 24 instead of being rotatably mounted thereon. A sprocket 76 is secured to the jack shaft 40, and is connected by a sprocket chain 77 to the sprocket 71. In this embodiment of my invention, the sprocket 70 or the sprocket 71 or both together may be clutched to the crank shaft of the prime mover 47. Accordingly, the sprockets 70 and 75 and the chain connecting the two are idle while the rotary is being driven; and in like manner, the sprockets 71 and 76 and the chain 77 are idle while the counter-shaft 24 is being driven.

My improved drawworks has the advantage of a power take-off, such as the sprocket 43, which may be driven independently of the counter-shaft of the drawworks. This advantage is present during both the operation of making up a string of pipe and during the drilling itself; since during the making up of the string of pipes, the jack shaft carrying the power take off is stationary, it being possible with my improved construction to drive the drum shaft without driving the jack shaft. During the drilling operation itself, the power take-off is driven; but the three remaining shafts of the drawworks, namely, the counter-shaft, the line shaft, and the drum shaft may be stationary. The importance of this is made clear by the fact that the drum need not be in operation while the rotary is being driven; and in likewise manner the rotary need not be driven while the drum is used to wind in or pay out the rope.

A further advantage of my invention is that while the independent operation of the power take-off and the counter-shaft is present in my improved construction, at the same time the power take-off is so arranged that the driving connections to the rotary pass along one side of the drawworks. These driving connections may be approximately horizontal, with the attendant advantage of efficient drive and convenience to the operator in getting about the hoist.

The embodiment of my invention shown in Fig. 1 has the further advantage that the speed at which the rotary may be driven may be varied. When different drilling conditions are encountered, variation in the speed of drive of the rotary is desirable; and this is made possible by my improved construction. Where it is desired that the sprocket and chain driving connections to the counter-shaft be stationary while the rotary is being driven, and vice versa, the construction shown in Fig. 3 may be employed.

While I have illustrated and described two specific arrangements of driving connections for a drawworks, it will be understood that the invention is not restricted to the particular construction and arrangements shown, but may be variously modified within the contemplation of the invention and under the scope of the following claims.

I claim:

1. In combination, a drawworks having a counter-shaft, a jack shaft disposed parallel to said counter-shaft and extending laterally beyond the drawworks, a rotary drive sprocket on the extending portion of the jack shaft, driving means for the drawworks, operative driving connections between said driving means and said counter-shaft for driving the same, and other operative driving connections between said driving means and said rotary drive sprocket including said jack shaft and variable speed driving mechanism.

2. In combination, a drawworks having a counter-shaft, a jack shaft disposed parallel to said counter-shaft and extending laterally beyond the drawworks, a rotary drive sprocket secured on the extending portion of the jack shaft, a prime mover, and a pair of operative driving connections, one extending between said prime mover and said counter-shaft for driving the same and the other extending between said prime mover and said jack shaft, said last mentioned connection including variable speed driving mechanism for driving the rotary drive sprocket at any one of a plurality of speeds selectively.

3. In a rotary drawworks, the combination of a frame structure having two vertical posts and bearings for rotatably supporting four parallel shafts, a drum mounted on one of said shafts, driving connections between said drum shaft and a second of said shafts, driving connections between said second shaft and a third of said shafts, driving means for the drawworks operatively connected with the third shaft and the fourth shaft for independently driving either the third or fourth shaft selectively, and a rotary drive sprocket carried by the fourth shaft.

4. In a rotary drawworks, the combination of a frame structure having two vertical posts and bearings for rotatably supporting four parallel shafts, one of said shafts carrying a drum and another of said shafts being the line shaft of the drawworks, the bearings for said drum shaft and said line shaft being carried by the posts, driving means for the drawworks operatively connected with the other two shafts for independently driving either shaft selectively, a rotary drive sprocket carried by one of said last mentioned shafts, and operative driving connections including said line shaft for driving the drum from the other of said selectively driven shafts.

5. In a rotary drawworks, the combination of a frame structure having two vertical posts and bearings for rotatably supporting a drum shaft, a line shaft, a counter-shaft and a jack shaft, the bearings for the drum shaft and the line shaft being carried by the posts, a drum shaft, a line shaft, a counter-shaft and a jack shaft, said jack shaft extending laterally beyond the drawworks, a drum mounted on said drum shaft, a rotary drive sprocket secured to the extending portion of the jack shaft, driving means for the drawworks operatively connected with the counter-shaft and the jack shaft for independently driving either shaft selectively, and operative driving connections for driving the drum from the counter-shaft through the line shaft.

6. In a rotary drawworks, the combination of a frame structure having two vertical posts and bearings for rotatably supporting a drum shaft, a line shaft, a counter-shaft and a jack shaft, the bearings for the drum shaft and the line shaft being carried by the posts, a drum shaft, a line shaft, a counter-shaft and a jack shaft, said jack shaft extending laterally beyond the drawworks, a drum mounted on said drum shaft, a rotary drive sprocket on the extending portion of the jack shaft, driving means for the drawworks, operative driving connections between said driving means and said counter-shaft, other operative driving connections between said driving means and said rotary driving sprocket including said jack shaft and variable speed driving mechanism, and operative driving connections for driving the drum from the counter-shaft through the line shaft.

7. In a rotary drawworks, the combination of a frame structure having two vertical posts and bearings for rotatably supporting a drum shaft, a line shaft, a counter-shaft and a jack shaft, the bearings for the drum shaft and the line shaft being carried by the posts, a drum shaft, a line shaft, a counter-shaft and a jack shaft, said jack shaft extending laterally beyond the drawworks, a drum mounted on said drum shaft, a rotary drive sprocket on the extending portion of the jack shaft, driving means for the drawworks, operative driving connections between said driving means and said counter-shaft, other operative driving connections between said driving means and said rotary drive sprocket including said jack shaft and variable speed driving mechanism, operative driving connections for driving the drum from the counter-shaft through the line shaft, and means for controlling said operative driving connections for independently driving either said sprocket or said counter-shaft selectively.

In testimony whereof I have hereunto set my hand.

EDGAR E. GREVE.

DISCLAIMER 1,918,097.—*Edgar E. Greve*, Bellevue, Pa. DRAWWORKS. Patent dated July 11, 1933. Disclaimer filed November 3, 1934, by the assignee, *Oil Well Supply Company*.

Hereby enters this disclaimer to that part of the specification and claims, to wit: Claim 3, which is in the following words, to wit:

"3. In a rotary drawworks, the combination of a frame structure having two vertical posts and bearings for rotatably supporting four parallel shafts, a drum mounted on one of said shafts, driving connections between said drum shaft and a second of said shafts, driving connections between said second shaft and a third of said shafts, driving means for the drawworks operatively connected with the third shaft and the fourth shaft for independently driving either the third or fourth shaft selectively, and a rotary drive sprocket carried by the fourth shaft."

[*Official Gazette January 22, 1935.*]